No. 783,075. PATENTED FEB. 21, 1905.
C. E. RHOADES.
BISCUIT MOLDING MACHINE.
APPLICATION FILED MAY 21, 1904.

2 SHEETS—SHEET 1.

Fig.3ª

Witnesses
Georgiana Chace
Palmer A. Jones

Inventor
Charles E. Rhoades
By Luther V. Moulton
Attorney

No. 783,075. PATENTED FEB. 21, 1905.
C. E. RHOADES.
BISCUIT MOLDING MACHINE.
APPLICATION FILED MAY 21, 1904.

2 SHEETS—SHEET 2.

Witnesses
Georgiana Chase
Palmer A. Jones

Inventor
Charles E. Rhoades
By Luther V. Moulton
Attorney

No. 783,075. Patented February 21, 1905.

UNITED STATES PATENT OFFICE.

CHARLES E. RHOADES, OF BATTLECREEK, MICHIGAN, ASSIGNOR OF ONE-HALF TO CLARENCE G. VARY, OF BATTLECREEK, MICHIGAN.

BISCUIT-MOLDING MACHINE.

SPECIFICATION forming part of Letters Patent No. 783,075, dated February 21, 1905.

Application filed May 21, 1904. Serial No. 209,100.

*To all whom it may concern:*

Be it known that I, CHARLES E. RHOADES, a citizen of the United States, residing at Battlecreek, in the county of Calhoun and State of Michigan, have invented certain new and useful Improvements in Biscuit-Molding Machines; and I do hereby declare the following to be a full, clear, and exact description of the invention, such as will enable others skilled in the art to which it appertains to make and use the same.

My invention relates to improvements in machines for molding plastic material, and more particularly to such machines for molding buscuits made of flaked and malted cereals; and its object is to provide a machine of great capicity, a machine that will mold both the upper and the under sides of the buscuit, and to provide the device with various new and useful features hereinafter more fully described, and particularly pointed out in the claims.

My invention consists, essentially, of a series of three carrying-chains at each side of the machine, the lower chain supporting the lower half of the molds, the middle chain carrying the boxes for containing the material, and the upper chain carrying the upper half of the molds mounted on suitable plungers to enter the boxes, means for supporting the chains, adjustable shafts at one end of the machine for taking up the slack of the chains and for adjusting the same, adjustable means for driving the shafts, gearing connecting the shafts at the other end of the machine, whereby the respective parts of the mold and the boxes are brought in proper relation to each other, and in various details of construction and arrangement of parts, as hereinafter more fully described, reference being had to the accompanying drawings, in which—

Figure 1:
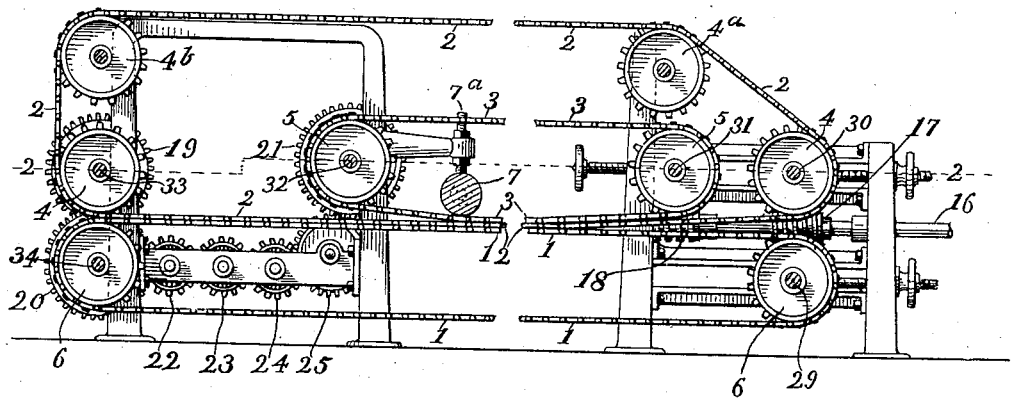
Figure 2:
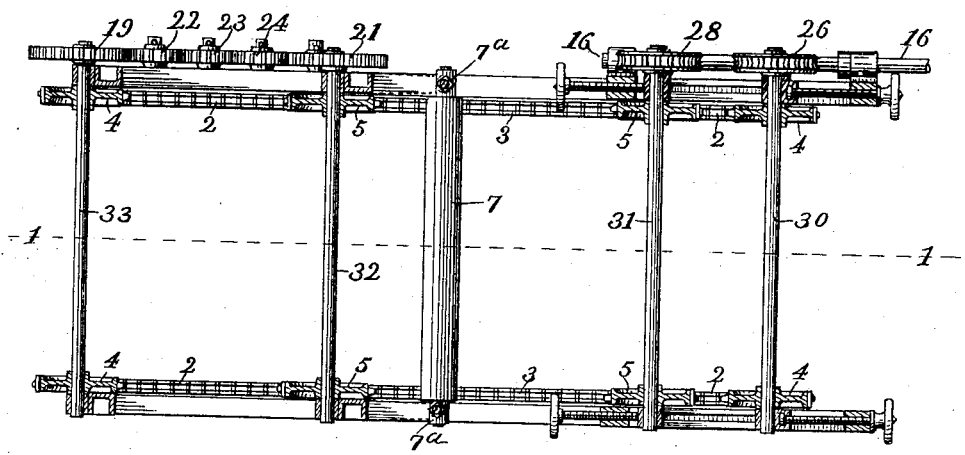
Figure 3:
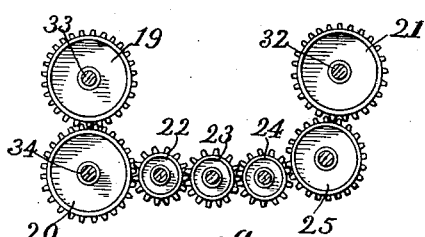
Figure 3:
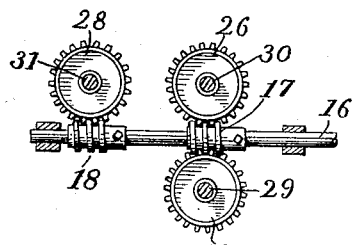
Figure 4:
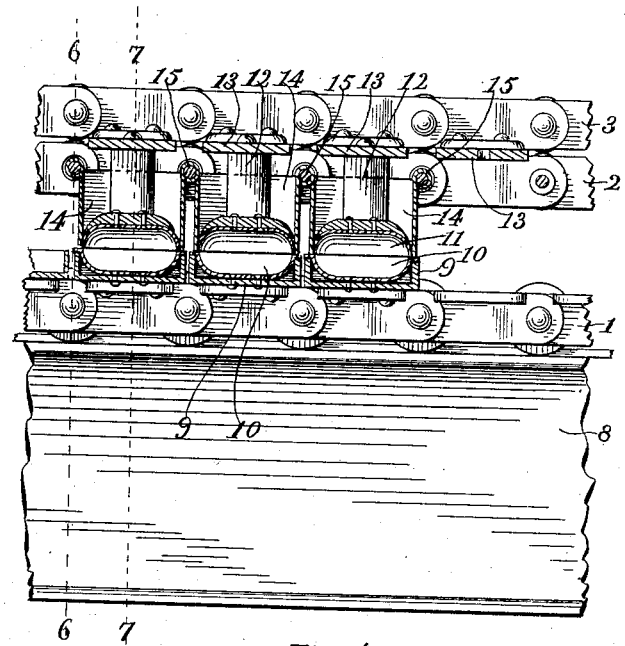
Figure 6:
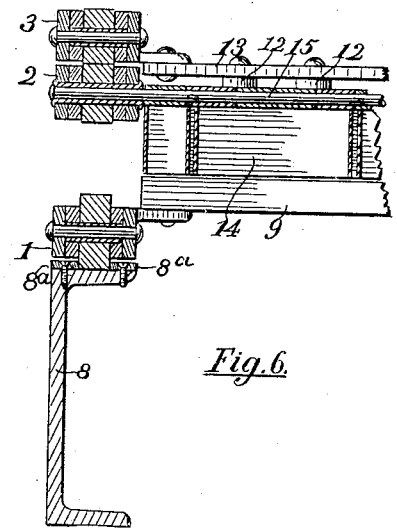
Figure 5:
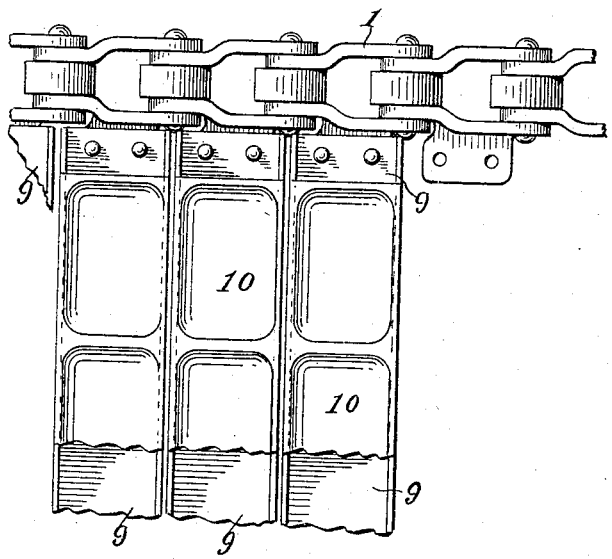
Figure 7:
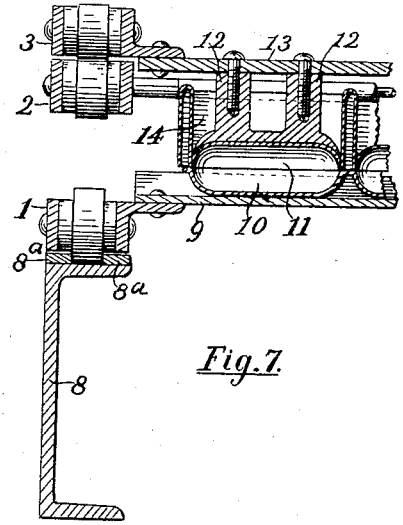

Figure 1 is a vertical section on the line 1 1 of Fig. 2, showing the system of chains and means for operating the same; Fig. 2, a horizontal section of the same on the line 2 2 of Fig. 1; Fig. 3, a detail of the adjustable shafts and the adjustable driving mechanism of the same; Fig. 3$^a$, the connecting-gearing at the opposite end of the machine; Fig. 4, an enlarged detail, in vertical section, showing the arrangement of chains and parts of the mold and boxes attached thereto; Fig. 5, a plan view of the lower chain and a portion of the molds carried thereby; Fig. 6, a transverse vertical section on the line 6 6 of Fig. 4, and Fig. 7 the same on the line 7 7 of Fig. 4.

Like numerals refer to like parts in all of the figures.

Arranged at each side of the machine are three suitable sprocket-chains 1, 2, and 3. The lower chains 1 extend horizontally in a closed circuit around sprocket-wheels 6 6, mounted on shafts 29 and 34, the bearings of shaft 29 being adjustable horizontally in suitable ways in the frame to tighten the chain. This chain is supplied with suitable rolls, and its upper part is held in horizontal plane by means of a suitable channel-bar 8, mounted on the frame and engaged by the rolls of the chain, and the chain is kept in alinement by guide-strips 8$^a$ on the channel-bar and at the respective sides of the rolls. Transverse channel-bars 9 are attached at their respective ends to the opposing links of these chains and support the lower parts of the biscuit-molds, which parts are of stamped sheet metal having the respective edges supported by the flanges of the channel-bar and their middle portion resting on the web of the bar. The chain 2 extends horizontally above the upper part of the chain 1 and thence around the sprocket-wheels 4 4 on shafts 30 and 33, the shaft 30 being adjustable in the frame to take up slack of the chain. This chain extends upward and around the chain 3, and its upper parts are supported on idlers 4$^a$ and 4$^b$. The chains 2 at the respective sides of the machine are connected by transverse rods 15, which constitute the pivots of the links and journals of the rolls of these chains and on which rods are pivotally supported boxes 14, open at the top and bottom and having parallel sides and of length and width equal to the molds with which they coact. These two chains are adjusted, as hereinafter described, so that the boxes will properly coact with the molds, as shown in Fig. 4. The chain 3 extends at each side within the chain 2 and above the lower part of the same and is shorter than the other chains and extends around sprocket-wheels 5, mounted on shafts 31 and 32, the shaft 31 being adjustable in the frame to take up the slack of this chain and adjust the same. On these chains 3 are attached transverse bars 13, to which are attached plungers 12, adapted to enter the boxes 14 and having attached thereto upper molds 11, corresponding in shape to the lower molds 10 and adapted to coact therewith, there being a plunger and mold to each box on the chain 2. The shafts 34, supporting the lower chain 1, and the shaft 33, supporting the middle chain 2, are so spaced apart as to bring the boxes supported by the chain 2 with their lower edges resting upon the top of the molds 10. They then in this position pass under the shaft 32, and this shaft is located a proper distance above the chains 1 and 2 to bring the plungers and upper half-molds directly above the boxes, and the chains 3 are then depressed by a suitable roll 7, mounted in vertically-adjustable bearing $7^a$, and thus the plungers and upper molds are forced downward and the contents of the boxes compressed between the molds. The drawings show the machine broken, and it is understood that the machine is extended in the middle a sufficient distance to permit the contents of the molds to be held in compressed condition thereby and heated therein by any suitable means, if so desired. The shafts 31 and 30 are located at such distance above the upper part of the chain 1 that the plungers and upper molds will be withdrawn from the boxes as the chains rise to pass around the wheels 5, and the boxes also lift clear of the biscuits as the chains 2 rise and pass around the wheels 4, and finally as the lower chain passes around the wheel 6 the biscuits will be discharged from the lower part of the molds into or upon any suitable receptacle. (Not shown.) To drive these chains, suitable worm-gears 26, 27, and 28 are fixed on the respective shafts 30, 29, and 31. A suitable shaft 16 is provided, which extends between the gears 26 and 27 and adjacent to the gears 28, and on this shaft is adjustably mounted worm-wheels 17 and 18, engaging the worm-gears to operate the same. These three shafts drive the three chains by means of the sprocket-wheels mounted on the shafts. At the other end of the machine the shafts 32, 33, and 34 are all connected to rotate simultaneously by means of a train of gears, (represented in Fig. $3^a$ in detail,) consisting of the gears 19, 20, and 21 on the respective shafts, the gears 19 and 20 intermeshing and the gears 20 and 21 connected by the train of gears 22, 23, 24, and 25. The shafts 29, 30, and 31 being adjustable horizontally to take up the slack of the chains can be properly adjusted to bring the parts supported by the chains in proper relation by adjusting the worm-wheels on the shaft 16, and, if necessary, these wheels may also be adjusted longitudinally of the shaft to properly relate them to the gears, and at the other end of the machine by means of connecting train of gears the chains are all obliged to move simultaneously and in proper relation to bring the parts supported thereby in correct position to properly coact, as in Fig. 4.

I do not herein claim the mechanism for simultaneously moving the three pairs of chains and parts attached; but the same is reserved for a separate application pursuant to the requirement of the office for division of this application.

Having thus fully described my invention, what I claim, and desire to secure by Letters Patent, is—

1. The combination of three pairs of sprocket-chains, means for simultaneously moving all of the chains, lower molds carried by the lower chains, boxes carried by the middle chains, said boxes being open at both top and bottom, upper molds carried by the upper chains, and means for moving the molds toward and from each other.

2. The combination of a pair of chains having rolls, angle-irons forming tracks and traversed by said rolls, bed-plates attached to said chains and adapted to support pans, a pair of middle chains, transverse rods connecting the same, boxes open at the top and bottom and pivoted on the rods, a pair of upper chains, plungers connected to the same, rolls engaging the lower part of the upper chain to depress the plungers, and means for simultaneously moving said chains.

3. The combination of a pair of sprocket-chains provided with rolls, tracks supporting said chains and traversed by the rolls, lower molds supported and carried by the chains, a middle chain, boxes open at the top and bottom and supported by the middle chains and also adapted to rest on the lower molds, an upper chain, upper molds attached to the upper chain, and adapted to enter the boxes, and means for simultaneously moving the chains.

4. The combination of a pair of lower chains provided with rolls, tracks traversed by said rolls, bed-plates connected to the chains at their respective ends, lower molds attached to said bed-plates, a pair of middle chains extending above the lower chain and connected by transverse rods, boxes supported on the rods, and open at the top and bottom, a third pair of chains, transverse bars connecting said chains, plungers attached to the bars, and upper molds attached to the plungers, and adapted to coact with the lower molds, and means for simultaneously moving the chains.

5. The combination of a pair of lower chains provided with rolls, tracks traversed by the rolls, guide-strips on the tracks and at each side of the rolls, lower molds supported by the chains, middle chains above the lower chain, rods connecting the middle chains, boxes open at the top and bottom and pivoted on the rods, a pair of upper chains, plates connecting the upper chains, plungers attached to the plates, upper molds attached to the plungers and adapted to enter the boxes, and means for simultaneously moving the chains.

6. The combination of a pair of lower chains provided with rolls, tracks traversed by the rolls and supporting the chains, channel-bars connected at their respective ends to the chains, molds supported by the channel-bars, a pair of middle chains, transverse rods connecting the said chains, boxes open at top and bottom and pivoted on said rods, a pair of upper chains, transverse plates attached to the upper chains at their respective ends, plungers attached to the plates, upper molds attached to the plungers, and means for raising and lowering the middle and upper chain to vertically move the boxes, upper molds, and plungers.

7. The combination of two lower chains, lower molds supported on the chains, means for supporting the chains in a horizontal plane, a pair of middle chains, boxes open at the top and bottom and carried by the middle chains, a pair of upper chains located within the middle chains and at a distance therefrom, and a depressing-roll engaging the upper chains to move the same downward toward the middle and lower chains, and upper molds attached to the upper chain and vertically movable therewith.

8. The combination of a pair of lower chains, lower molds supported by said chains, a pair of middle chains, boxes open at the top and bottom and supported by the middle chains, a pair of upper chains, upper molds attached to the upper chains, means for simultaneously moving said chains comprising adjustable shafts and sprocket-wheels at one end of the machine, adjustable worm-gearing to operate said shafts, sprocket-wheels engaging said chains at the other end of the machine and mounted on stationary shafts, and a train of gearing connecting said shafts to rotate the same simultaneously.

9. The combination of a series of transverse channel-bars, sheet-metal lower molds having a series of depressions engaging the web of the bars, and flanges engaging the flanges of the bars, means for moving the bars laterally, boxes open at top and bottom and engaging the lower molds, means for moving the boxes vertically and also laterally with the lower molds and upper molds movable vertically within the boxes and also movable laterally, and means for moving the upper molds.

10. The combination of an endless movable bed, lower molds mounted on the bed, means for moving the bed, boxes open at top and bottom, means for placing the boxes upon the lower molds, and removing the same therefrom, plungers adapted to enter the respective boxes, upper molds attached to the plungers, and means for operating the plungers.

In testimony whereof I affix my signature in presence of two witnesses.

CHARLES E. RHOADES.

Witnesses:
W. C. OSBORNE,
B. E. KING.